(12) United States Patent
Arata

(10) Patent No.: US 6,663,047 B1
(45) Date of Patent: Dec. 16, 2003

(54) MULTI-PURPOSE AIRCRAFT CAVITY

(75) Inventor: Allen A. Arata, Hawthorne, CA (US)

(73) Assignee: Northrop Grumman, Los Angeles, CA (US)

( * ) Notice: Subject to any disclaimer, the term of this patent is extended or adjusted under 35 U.S.C. 154(b) by 0 days.

(21) Appl. No.: 10/251,596

(22) Filed: Sep. 20, 2002

(51) Int. Cl.$^7$ .................................................. B64D 1/06
(52) U.S. Cl. .............................. 244/137.1; 244/137.4; 89/1.51; 89/1.815
(58) Field of Search ................... 244/137.1, 137.4, 244/118.1, 102 R, 100 R; 89/1.51, 1.58, 1.59, 1.8, 1.815, 1.801, 1.802, 1.803

(56) References Cited

U.S. PATENT DOCUMENTS

| | | | |
|---|---|---|---|
| 1,349,105 A | | 8/1920 | Ross |
| 1,627,191 A | * | 5/1927 | Martin ..................... 244/118.1 |
| 2,299,227 A | * | 10/1942 | Goetz ..................... 244/102 R |
| 2,320,574 A | * | 6/1943 | Dornier .................. 244/102 R |
| 2,395,547 A | | 2/1946 | Hojnowski |
| 2,741,446 A | * | 4/1956 | Jakimiuk .................... 244/108 |
| 2,749,064 A | | 6/1956 | Kuhlman, Jr. |
| 2,841,346 A | | 7/1958 | Petter |
| 2,975,676 A | * | 3/1961 | Butler ..................... 244/137.1 |
| 3,037,723 A | | 6/1962 | Taylor |
| 3,174,712 A | | 3/1965 | Ricard |
| 3,335,981 A | * | 8/1967 | Pauli et al. ............. 244/102 R |
| 3,432,125 A | | 3/1969 | Schroeder, Jr. |
| 4,697,764 A | | 10/1987 | Hardy et al. |
| 4,838,502 A | | 6/1989 | Pinson |
| 4,930,398 A | | 6/1990 | Sharples |
| 5,071,092 A | | 12/1991 | Williams et al. |
| 5,222,699 A | | 6/1993 | Albach et al. |
| 5,350,136 A | | 9/1994 | Prosser et al. |
| 5,636,813 A | * | 6/1997 | Hardy et al. ............. 244/118.1 |
| 5,683,061 A | | 11/1997 | Hardy et al. |
| 5,803,405 A | | 9/1998 | Ellis et al. |
| 6,068,215 A | | 5/2000 | Gruensfelder et al. |
| 6,536,711 B1 | * | 3/2003 | Conway, Jr. et al. .... 244/129.5 |

FOREIGN PATENT DOCUMENTS

| | | |
|---|---|---|
| WO | WO 96/40552 | 12/1996 |
| WO | WO 00/21794 | 4/2000 |

* cited by examiner

Primary Examiner—Galen L. Barefoot
(74) Attorney, Agent, or Firm—Stetina Brunda Garred & Brucker

(57) ABSTRACT

There is provided an aircraft which can minimize its radar signature emission. Such aircraft comprises a fuselage having a lower fuselage portion. An internal fuselage cavity is defined within the lower fuselage portion and contains all landing gears and bombs therein. Moreover, a cavity-enclosing door is engaged to the lower fuselage portion. This specific cavity-enclosing door may form a closed position relative to the internal fuselage cavity to enclose all of the landing gears and bombs therein. In this respect, enclosure of all of the landing gears and bombs solely through the cavity-enclosing door may minimize the radar signature emission from the fuselage.

27 Claims, 5 Drawing Sheets

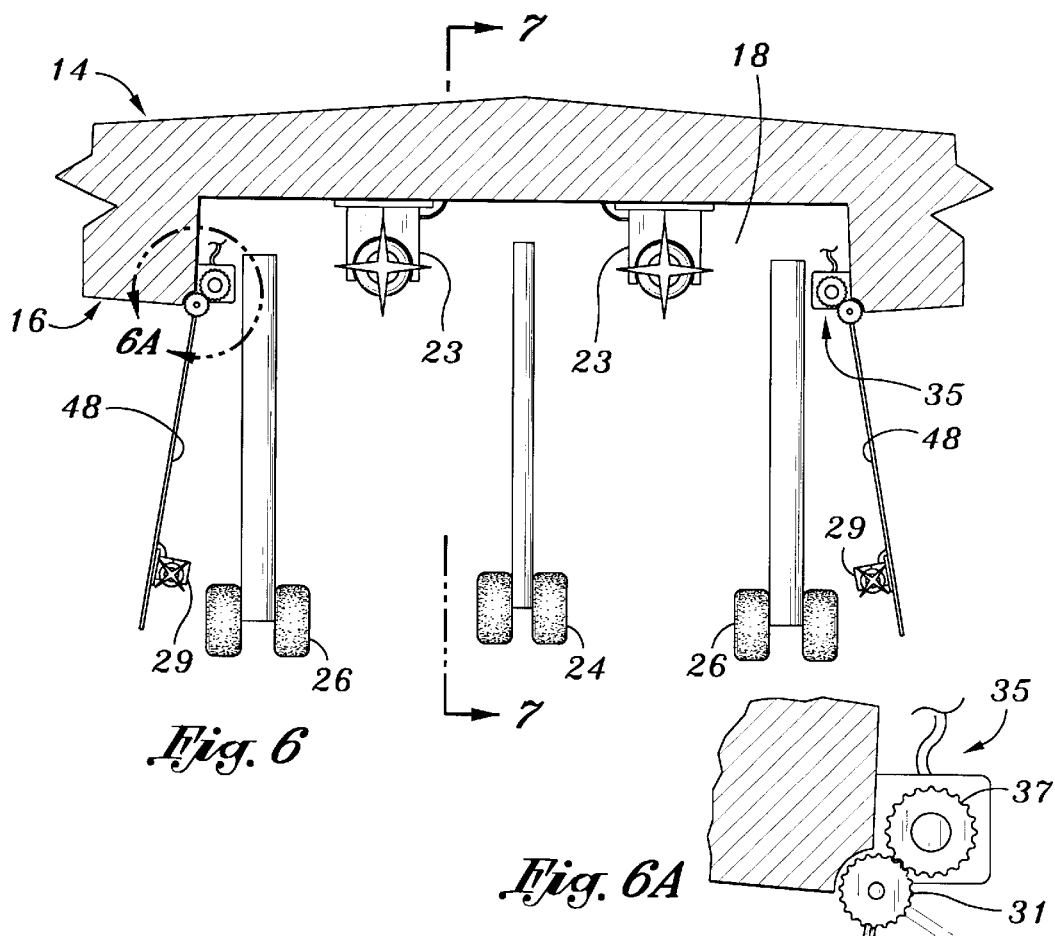
*Fig. 6*
*Fig. 6A*
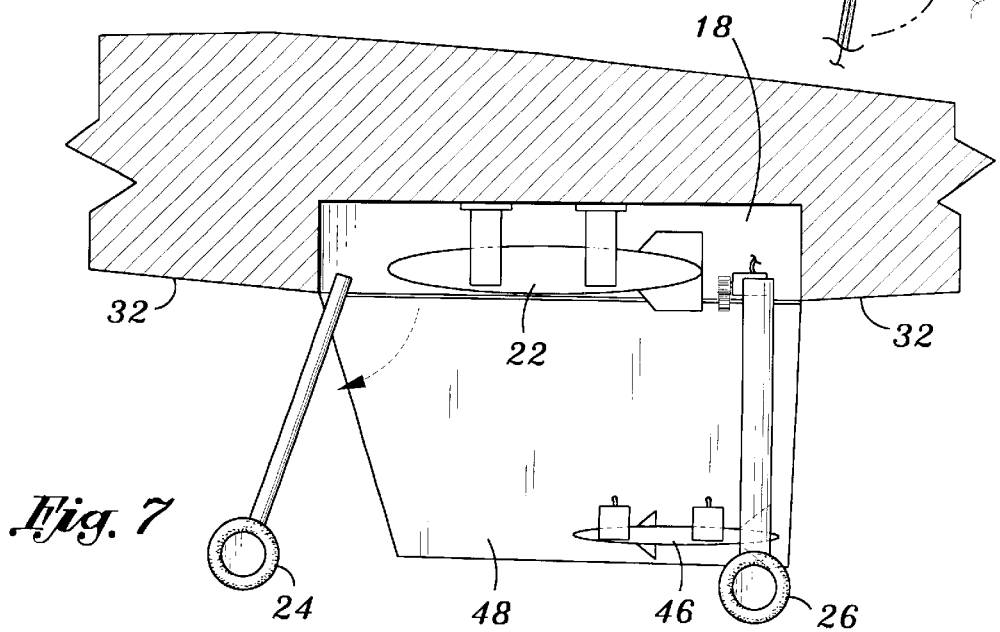
*Fig. 7*

MULTI-PURPOSE AIRCRAFT CAVITY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to an apparatus and a method for reducing radar signature emissions from an aircraft, and more particularly to an improved apparatus and method for minimizing radar signature emissions from an aircraft by utilizing a single cavity and door to enclose all landing gears, bombs, and missiles within its fuselage.

Modern aircrafts such as fighter jets typically share two design considerations to optimize their flying. One such design consideration is the emphasis that components (e.g., landing gears and weapons) carried by these aircrafts should be placed near its center of gravity. For example, weapons such as bombs and missiles are commonly positioned near the aircraft's center of gravity to the best extent possible such that the flight characteristics do not fluctuate by their deployment. Likewise, the landing gears are also disposed around this proximate area as it facilitates the rotation of the aircraft at fairly low take-off speeds.

The other design consideration that many of these modern aircrafts stresses is the concealment of their carried components therewithin to reduce radar signature emissions and aerodynamic drags. More specifically, exposed landing gears and weapons drastically increase the radar cross section of the aircraft, and hence reflects and/or emits more radar signatures. Further, these exposures tend to be subjected to significant air drags thereby diluting the aircraft's aerodynamics. Accordingly, as exemplified in FIG. 1, these aircrafts conceal their carried components within their structures, typically in their fuselages, so that their radar signature emissions and aerodynamic drags are improved.

Although such concealment achieves the primary objective of lowering radar signatures and aerodynamic drags, these existing aircrafts nonetheless possess certain deficiencies which detract from their overall utility. Perhaps the greatest deficiency of the existing aircrafts is the use of multiple cavities and/or bays within their fuselages to conceal the landing gears, missiles and bombs. As shown in FIG. 1, the existing aircrafts define numerous cavities (typically seven cavities) to separately contain landing gears, missiles, and bombs therein which are then enclosed by their respective doors. The existence of multiple cavities and matching number of doors appears to be inevitable as only one component is enclosed per cavity and door (best shown in FIG. 1).

However, the existence of multiple cavities and doors greatly undermine the purpose of why the components are concealed in the first place. It should be noted that edges and gaps formed on the aircraft's structure produces more radar signatures than a smooth and continuous one. In this regard, each cavity-enclosing door includes at least four edges which further form gaps and/or cracks with its respective cavity when closing thereupon.

Because these aircrafts typically require at least seven separate cavities each with their respective door, the number of edges, gaps and cracks formed seems to be overbearing. Each of the door edges, gaps and cracks are capable of reflecting radar signals, not to mention being subjected to air drags to debilitate the aircraft's aerodynamics. Simply put, these deficiencies make the aircraft more easily detectable by enemy radars, and further contribute to the breakdown of its aerodynamics.

Thus, there has long been a need in the industry, and in the aerospace industry in particular, for an apparatus and a method for minimizing radar signature emissions from an aircraft by mitigating the number of door edges, gaps, and cracks. In this respect, the presently contemplated aircraft utilizes a single cavity and door to enclose all landing gears, air-to-ground bombs, and air-to-air missiles within the fuselage near its center of gravity, which also yields the advantage of further diminishing any aerodynamic drags.

BRIEF SUMMARY OF THE INVENTION

In accordance with the present invention, there is provided an aircraft which can minimize its radar signature emission. Such aircraft comprises a fuselage having a lower fuselage portion. An internal fuselage cavity is defined within the lower fuselage portion and contains all landing gears and bombs therein. Moreover, a cavity-enclosing door is engaged to the lower fuselage portion. This specific cavity-enclosing door may form a stowed position relative to the internal fuselage cavity to enclose all of the landing gears and bombs therein. In this respect, enclosure of all of the landing gears and bombs solely through the cavity-enclosing door may minimize the radar signature emission from the fuselage.

More specifically, the cavity-enclosing door may be hingeably or pivotally engaged to the lower fuselage portion of the fuselage. Such cavity-enclosing door has an outer door surface, whereas the fuselage has an outer fuselage surface. The outer door surface and the outer fuselage surface may be substantially flush with each other when the stowed position is formed. At least the outer fuselage surface and the outer door edges of the cavity-enclosing door should be substantially flush with each other when such position is formed.

In the present invention, the cavity-enclosing door may transition between the stowed position and a deployed position with respect to the internal fuselage cavity. This mobility of the cavity-enclosing door allows selective accessing of the landing gears and bombs from the internal fuselage cavity. In particular, the landing gears may be attached within the internal fuselage cavity in a manner as to retract in the stowed position and extend in the deployed position. In the preferred embodiment, the landing gears comprise a front landing gear and at least two back landing gears.

Moreover, the bombs may be releasibly attached within the internal fuselage cavity. By this attachment, the bombs can then be dropped from the internal fuselage cavity when the cavity-enclosing door opens. Smart bombs, such as global positioning system (GPS) guided bombs, may be utilized with the present invention. However, one of ordinary skill in the art will appreciate that other types, such as dumb bombs, may be used instead. As to one positional arrangement, each of the bombs may be selectively positioned between the landing gears. However, it should be recognized that other positional arrangements are readily available.

In addition, missiles may be releasibly attached to the inner door surface of the cavity-enclosing door. A person of ordinary skilled in the art will realize that a variety types of missiles, such as side winders or sparrows for example, can be used. Although the cavity-enclosing door may solely alternate between the stowed and deployed positions, it may further be adapted to be continuously positionable at any one of a number of positions lying therebetween. The missiles may be launched, either separately or collectively, at any one of these number of positions. The missiles may be enclosed with the landing gears and the bombs in the internal fuselage cavity when the cavity-enclosing door closes.

In accordance with the present invention, the cavity-enclosing door may comprise first and second door members. These door members may be jointly configured to form the stowed and deployed positions relative to the internal fuselage cavity. Notably, the first and second door members may converge toward one another when forming the stowed position. When forming the deployed position, they may diverge away from each other. The first and second door members may each have an outer centerline door edge. These outer centerline door edges may be immediately adjacent to each other when the stowed position is formed. Such edges may also simultaneously form a substantial flush relationship.

BRIEF DESCRIPTION OF THE DRAWINGS

These as well as other features of the present invention will become more apparent upon reference to the drawings wherein:

FIG. 6 is a sectional view along lines 3—3 of FIG. 2 and illustrating the cavity-enclosing door formed in a deployed position to extend all the landing gears from an internal fuselage cavity;

FIG. 6A is an enlarged view of a door-drive mechanism of FIG. 6 which is mounted between the internal fuselage cavity and the cavity-enclosing door;

FIG. 7 is a sectional view along lines 7—7 of FIG. 6 and illustrating the positional relationships between the extended landing gears, air-to-ground bombs and air-to-air missiles when the cavity-enclosing door forms a deployed position.

DETAILED DESCRIPTION OF THE INVENTION

Figure 2:
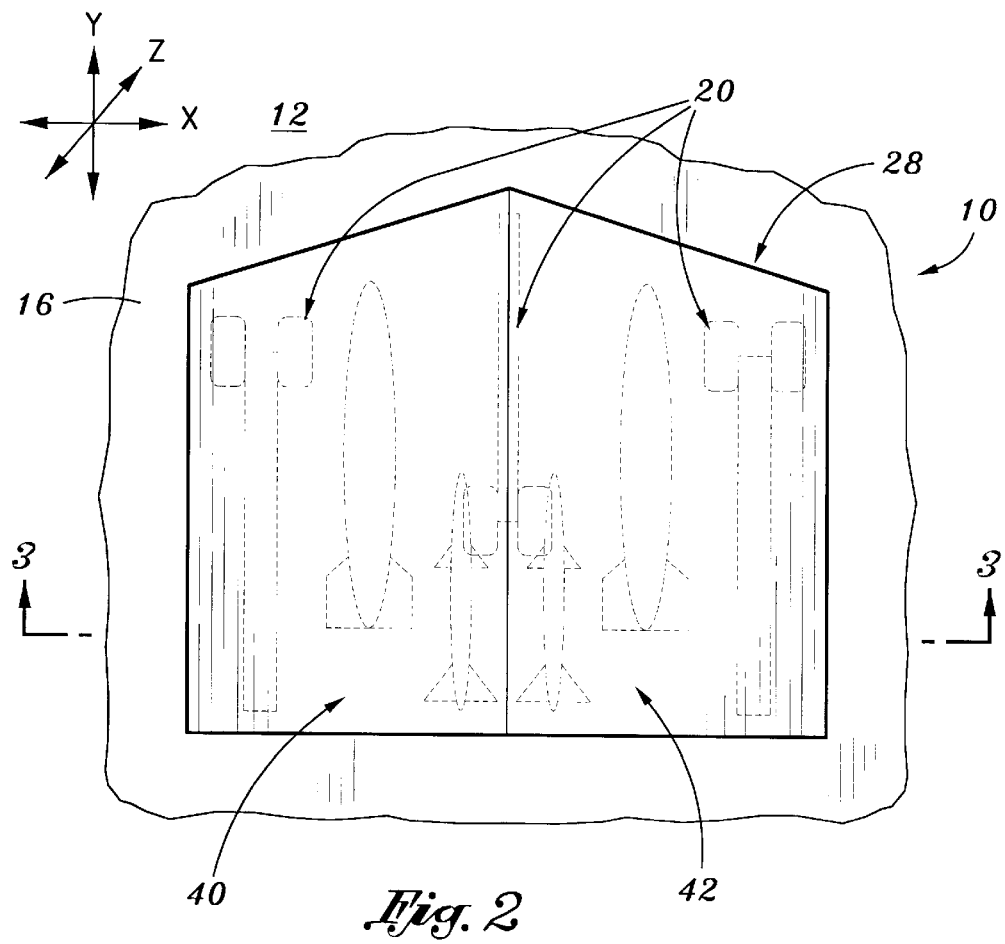
FIG. 2 is a bottom view of an aircraft's fuselage constructed in accordance with a preferred embodiment of the present invention and illustrating a cavity-enclosing door defined thereon.

Referring now to the drawings wherein the showings are for purposes of illustrating preferred embodiments of the present invention only, and not for purposes of limiting the same, FIG. 2 is a bottom view of a fuselage 10 of an aircraft 12 constructed in accordance with a preferred embodiment of the present invention. This fuselage 10 is specifically adapted to minimize radar signature emissions from the aircraft 12, as well as improve its aerodynamics. It should be recognized that the fuselage 10 depicted herein may be for a variety types of aircrafts 12, such as fighter jets (e.g., F-14 Tomcat, F-16 Falcon, F-18 Hornet) for example.

Figure 3:
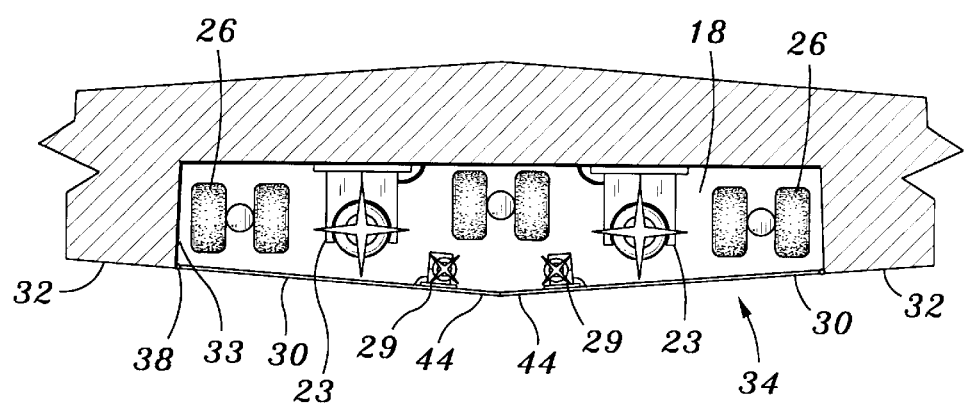
FIG. 3 is a sectional view along lines 3—3 of FIG. 2 and illustrating the cavity-enclosing door formed in a stowed position.
Figure 4:
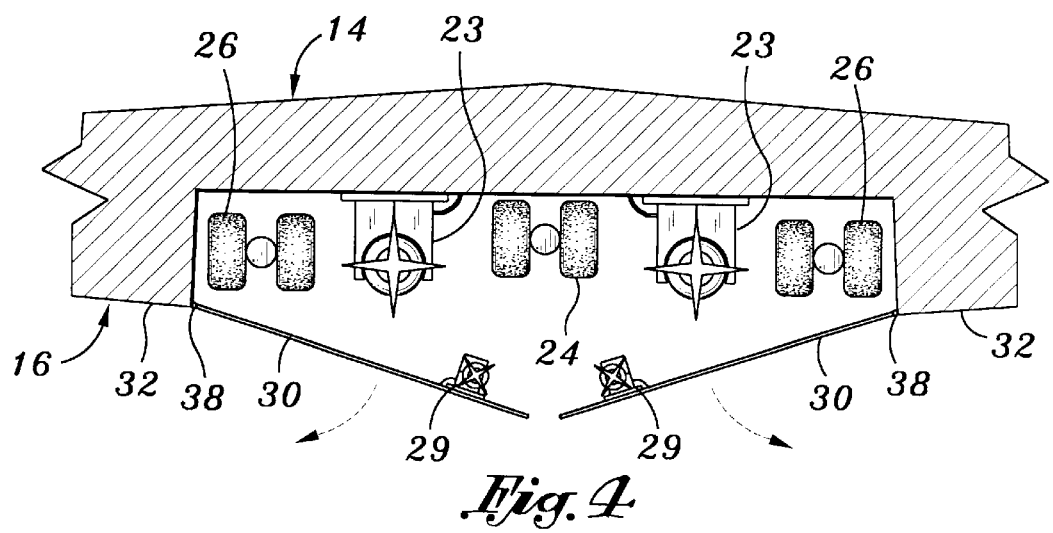
FIG. 4 is a sectional view along lines 3—3 of FIG. 2 and illustrating the cavity-enclosing door placed in one of a number of positions lying between stowed and deployed positions.
Figure 5:
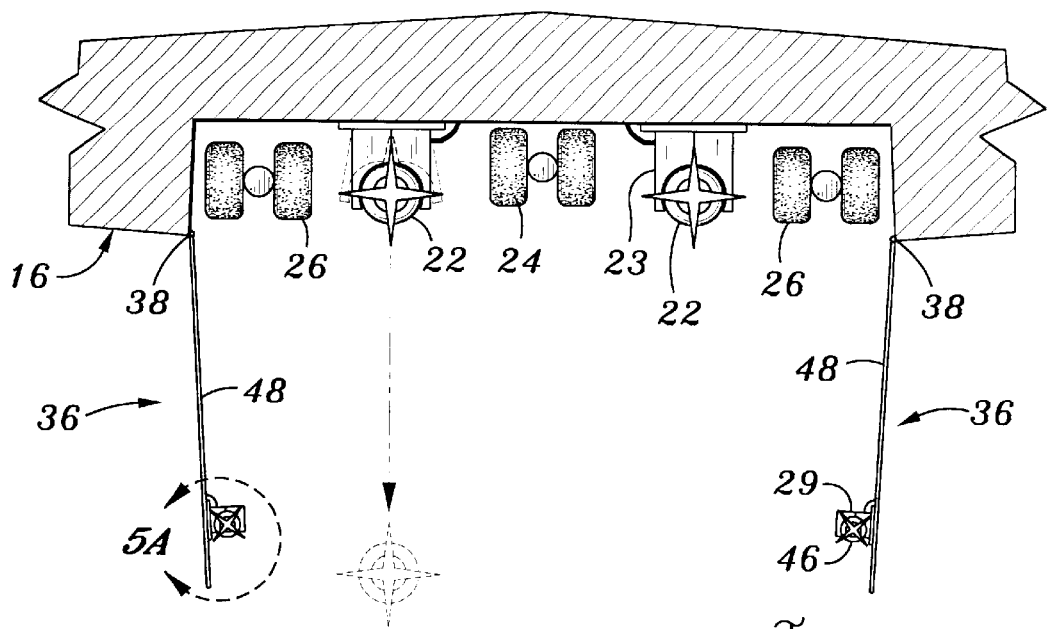
FIG. 5 is a sectional view along lines 3—3 of FIG. 2 and illustrating the cavity-enclosing door formed in a deployed position to release an air-to-ground bomb from an internal fuselage cavity.
Figure 5A:
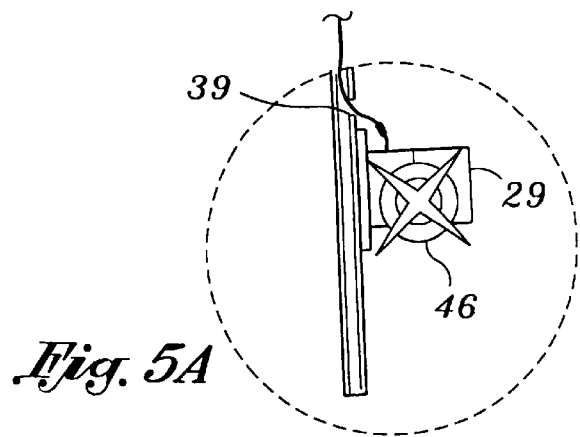
FIG. 5A is an enlarged view of a missile ejection system of FIG. 5 and illustrating missile wiring which is laid within the groove formed by the cavity-enclosing door.

Referring more particularly to FIGS. 2 and 3, the fuselage 10 has an upper fuselage portion 14 and a lower fuselage portion 16. Defined about and within the lower fuselage portion 16 is an internal fuselage cavity 18. The internal fuselage cavity 18 is essentially a compartmental space, recess or void which is formed within the lower fuselage portion 16 of the fuselage 10 (as shown in FIG. 3). Although the internal fuselage cavity 18 is generally pentagonal in shape, this is exemplary in nature and should not be limited thereto. It will be recognized by those of ordinary skill in the art that such cavity 18 may be formed to have a variety of shapes, configurations, and geometries. It is simply the concept of having a sufficiently deepened compartmental space, recess or void within the lower fuselage portion 16 that should be appreciated.

The internal fuselage cavity 18 should be adequately sized and deepened to contain at least all of the landing gears 20 and air-to-ground bombs 22 (e.g., global positioning system (GPS) guided bombs, incendiary bombs, fragmentation bombs, cluster bombs, napalm bombs) therein. Put simply, this required cavity 18 should provide a space which has a sufficient area and depth so that all landing gears 20 and air-to-ground bombs 22 can be accommodated therein. As exemplified in the provided figures, the internal fuselage cavity 18 may hold at least three landing gears 20, namely, front landing gear 24 and two back landing gears 26, along with at least two air-to-ground bombs 22.

Figure 8:
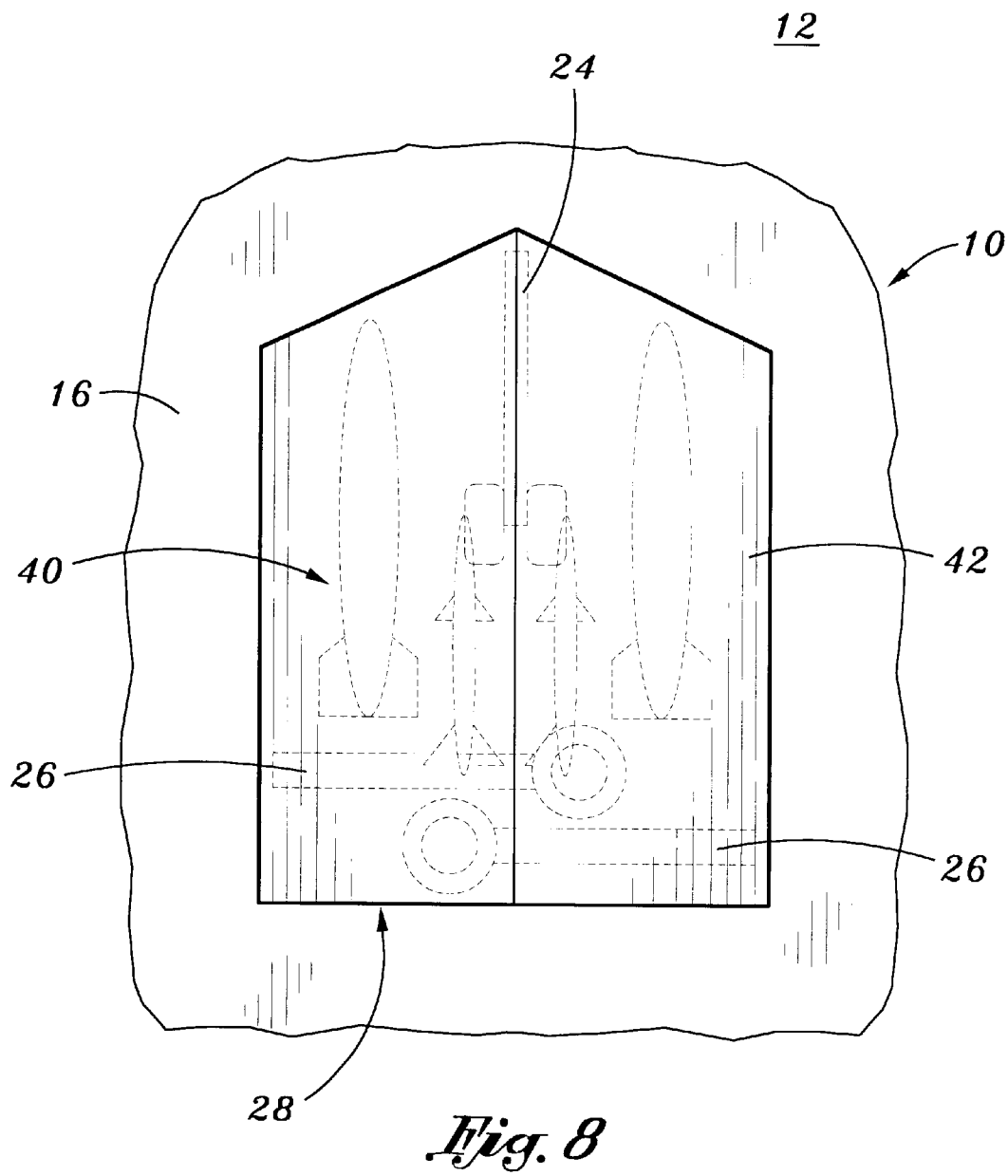
FIG. 8 is a bottom view of the aircraft's fuselage and illustrating back landing gears' alternate manner of retraction.

Referring now to FIGS. 2, 7 and 8, all of the landing gears 20 are engaged within the internal fuselage cavity 18 so as to be retractable and extendable with respect thereto. A person of ordinary skill in the art will appreciate that such engagement may be consistent with the conventional modes of retracting and extending the landing gears 120 typically seen in the existing aircrafts 112. It is the concept of encompassing all of the landing gears 20 within the internal fuselage cavity 18 that is important. The landing gears 20 may be retracted in a manner shown in FIG. 2 (back landing gears 26 disposed generally parallel to the front landing gear 24) or FIG. 8 (back landing gears 26 disposed generally perpendicular to the front landing gear 24).

In addition, the air-to-ground bombs 22 are attached within the internal fuselage cavity 18 in a way as to be stationed therein unless they are intentionally released therefrom. In this regard, the bombs 22 are releasibly engaged to a bomb releasing mechanism 23 and may be dropped from the internal fuselage cavity 18 for the purpose of striking a designated target location. The bomb releasing mechanism 23 may use its racks or rails 25 to controllably hold and release the air-to-ground bombs 22 by the pilot as typically done in the existing aircrafts 112. Of course, any necessary wiring for bomb release operations should be laid in a manner as to avoid all the landing gears 24, 26.

Referring now to FIGS. 3–7, the fuselage 10 of the present aircraft 12 comprises a cavity-enclosing door 28. The cavity-enclosing door 28 may be fabricated from any material. However, this door 28 should have a load-bearing skin that are sufficiently strong to support the missile ejection systems 29. Moreover, although not necessary, the outer door surface 30 of the cavity-enclosing door 28 may be made from the same material as the outer fuselage surface 32 of the fuselage 10. This would provide visual continuity between the outer surfaces 30, 32, as well as making it more practical in manufacture of the aircraft's overall structure. Furthermore, the cavity-enclosing door 28 is hingeably engaged to the lower fuselage portion 16. Due to such engagement, the cavity-enclosing door 28 is adapted to transition between a stowed position 34 and a deployed position 36 along a X–Z direction with respect to the internal fuselage cavity 18. By doing so, the landing gears 20 and the air-to-ground bombs 22 may be selectively accessed from the internal fuselage cavity 18 by opening the cavity-enclosing door 28 to its deployed position 36.

The cavity-enclosing door 28 may selectively transition between the stowed and deployed positions 34, 36 by utilizing a door-drive mechanism 35. This door-drive mechanism 35 may be mounted between the side walls 33 of the internal fuselage cavity 18 and the inner door surface 48 of the cavity-enclosing door 28 using any suitable known means (not shown). For instance, the door-drive mechanism 35 may be bolted or screwed to its respective locations. The mechanism 35 may comprise rotary actuators 37 each having a rotor 31. These rotary actuators 37 may rotate the rotors 31 upon receiving an electrical signal from the pilot. By providing the door-drive mechanism 35, stowed and deployed positions 34, 36 may be formed to perform various operations. Moreover, the mechanism 35 may be hydraulically, pneumatically or electrically powered to open and close the cavity-enclosing door 28.

Figure 1:
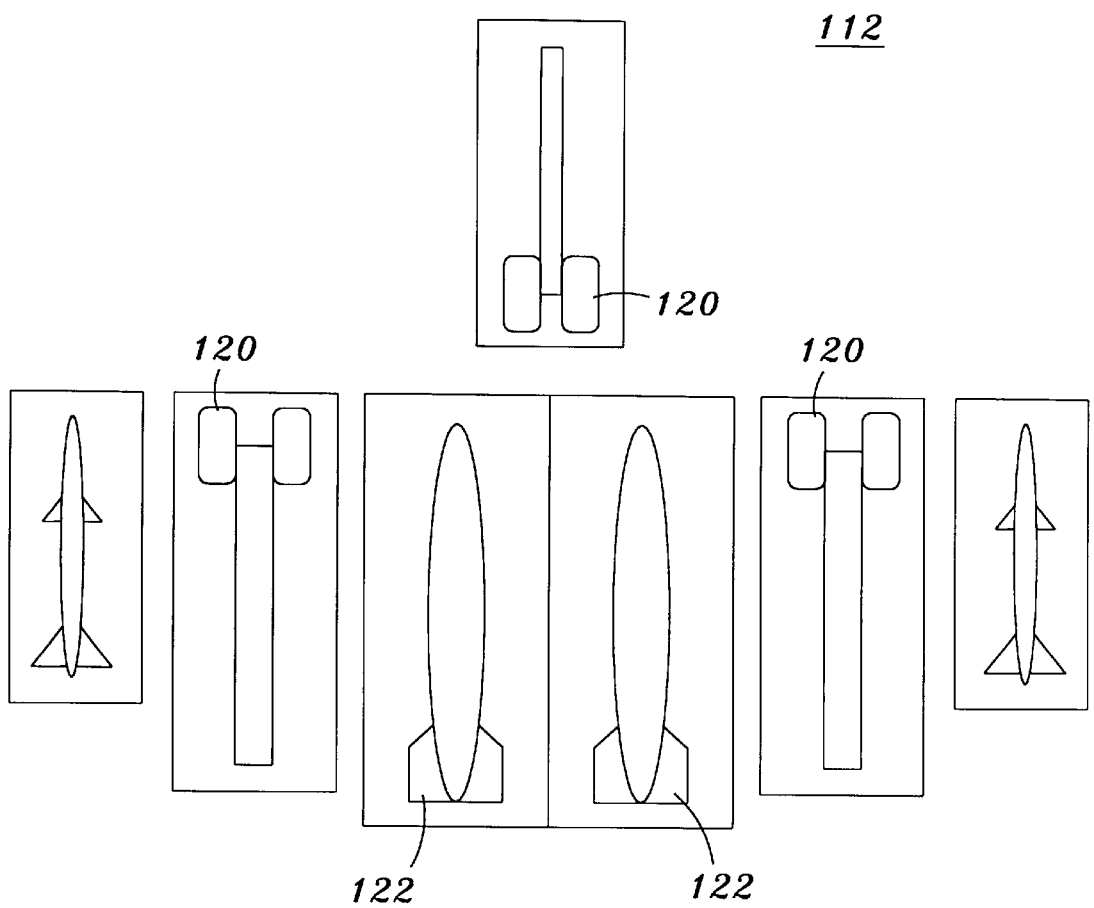
FIG. 1 is a top view of seven separate cavities each enclosed by their respective surface doors as utilized by prior art aircrafts.

When the cavity-enclosing door 28 forms the closed position 34, it is capable of enclosing all of the landing gears 20 and bombs 22 within the internal fuselage cavity 18. Enclosure of all of the landing gears 20 and bombs 22 solely through one cavity-enclosing door 28 minimizes the radar signature emissions from the fuselage 10 as the number of door edges, and the gaps or cracks formed collectively with the internal fuselage cavity 18, are significantly mitigated. In other words, the need to use multiple cavity-enclosing doors 28 as seen in the existing aircrafts 112 to separately enclose each component (e.g., bombs 122, landing gears 120) is eliminated, thus further eliminating the additional door edges, gaps, and/or cracks produced thereby (as shown in FIG. 1). As one of ordinary skill in the art will realize, the existence of door edges, gaps, cracks, and the like tends to increase the radar cross section of the aircraft 12, which in turn produces more radar reflectivity. In this respect, by utilizing only one cavity-enclosing door 28, the formation of such undesirable characteristics are greatly decreased. Furthermore, because the door edges, gaps, and/or cracks may somewhat hinder the aerodynamics of the aircraft 12, eliminating many of them would reduce any unnecessary air drags caused thereby, at least to some degree.

In the stowed position 34, the outer door surface 30 of the cavity-enclosing door 28 may be substantially flush with the outer fuselage surface 32 of the fuselage 10. Preferably, at least the outer door edges 38 of the cavity-enclosing door 28 should be in a flush relationship with the outer fuselage surface 32. However, this is not required. Of course, the landing gears 24, 26 are retracted within the internal fuselage cavity 18 when the cavity-enclosing door 28 is in the stowed position 34.

In particular, the cavity-enclosing door comprises a first door member 40 and a second door member 42 which are jointly adapted to form the stowed and deployed positions 34, 36 relative to the internal fuselage cavity 18. However, it is contemplated herein that the first door member 40 or the second door member 42 may individually be openable/closeable so that the air-to-ground bombs 22 may be selectively accessed from the internal fuselage cavity 18. The first and second door members 40, 42 can be opened and closed at their outer centerline door edges 44. In this manner, the door members 40, 42 may converge toward one another when forming the stowed position 34 whereat the outer centerline door edges 44 are immediately adjacent to each other in a substantially flush relationship upon reaching that position 34. By same token, the outer centerline door edges 44 may diverge away form each other so that the door members 40, 42 form the deployed position 36. Of course, upon reaching the deployed position 36, the landing gears 24, 26 may be extended from the internal fuselage cavity 18.

As noted above, the cavity-enclosing door 28 includes a missile ejection system 29 on each of its door members' inner door surface 48. In this regard, the inner door surface 48 should possess a skin which is capable of bearing such load. The necessary wiring connecting to the missile ejection systems 29 may run through a groove 39 which is formed between the outer and inner door surfaces 32, 48. This would prevent such wiring from potentially becoming entangled with any of the components of the landing gears 24, 26 during their retraction and extension. However, one of ordinary skill in the art will contemplate that the missile wiring may simply be fastened to the inner door surface 48 of the cavity-enclosing door 28 in a tight manner.

Between the stowed and deployed positions 34, 36, the cavity-enclosing door 28 may be continuously positionable at any one of a number of positions. Simply put, the cavity-enclosing door 28 may be stopped at any selected position lying between the stowed and deployed positions 34, 36. In that selected position, air-to-air missiles 46, which are releasibly attached to the inner door surface 48 of the cavity-enclosing door 28 via missile ejection systems 29, may be launched. The air-to-air missiles 46 may be fired individually or collectively. It will be recognized by those of ordinary skill in the art that the missile ejection system may releasibly attach air-to-air missiles 46 by utilizing rails or racks (not shown). After the missile 46 launch, the cavity-enclosing door 28 may close to thereby enclose all of the retracted landing gears 20, and any remaining air-to-ground bombs 22 or air-to-air missiles 46 within the internal fuselage cavity 18 of the aircraft 12.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An aircraft having minimized overall door edges to reduce a radar signature emission, the aircraft comprising:
   a fuselage having a lower fuselage portion;
   an internal fuselage cavity defined within the lower fuselage portion and including all retractable/extendable landing gears and bomb releasing mechanisms having air-to-ground bombs therein;
   a single cavity-enclosing door engaged to the lower fuselage portion and forming a stowed position relative to the internal fuselage cavity to enclose all of the landing gears and bomb releasing mechanisms therein; and
   wherein the single cavity-enclosing door is movable toward and away from the internal fuselage cavity independent of the retraction and extension of the landing gears with respect to the internal fuselage cavity, and wherein enclosure of all of the landing gears and bomb releasing mechanisms solely through the single cavity-enclosing door minimizes the overall door edges of the fuselage to reduce the radar signature emission from the fuselage.

2. The aircraft of claim 1 wherein the cavity-enclosing door is hingeably engaged to the lower fuselage portion.

3. The aircraft of claim 1 wherein the fuselage has an outer fuselage surface and the cavity-enclosing door has an outer door surface, the outer fuselage surface and the outer door surface being substantially flush with each other when the stowed position is formed.

4. The aircraft of claim 1 wherein the fuselage has an outer fuselage surface and the cavity-enclosing door has outer door edges, the outer fuselage surface and the outer door edges being substantially flush with each other when the stowed position is formed.

5. The aircraft of claim 1 wherein the cavity-enclosing door transitions from the stowed position to a deployed position relative to the internal fuselage cavity so as to selectively access the landing gears and bombs therefrom.

6. The aircraft of claim 5 wherein the cavity-enclosing door has an inner door surface and the internal fuselage cavity has side walls, the cavity-enclosing door being transitionable from the stowed position to the deployed position via a door-drive mechanism engaged between the inner door surface and the side walls.

7. The aircraft of claim 6 wherein the door-drive mechanism is a pneumatic door-drive mechanism.

8. The aircraft of claim 5 wherein the landing gears are attached within the internal fuselage cavity in a manner as to retract in the stowed position and extend in the deployed position.

9. The aircraft of claim 5 wherein the landing gears comprise a front landing gear and at least two back landing gears.

10. The aircraft of claim 5 wherein the air-to-ground bombs are releasibly attached to the bomb releasing mechanisms within the internal fuselage cavity and are dropable therefrom when the deployed position is formed.

11. The aircraft of claim 10 wherein the air-to-ground bombs are global positioning system (GPS) guided bombs.

12. The aircraft of claim 5 wherein each of the bomb releasing mechanisms are positionable between the landing gears.

13. The aircraft of claim 1 wherein the cavity-enclosing door comprises first and second door members jointly configured to form the closed position and an open position relative to the internal fuselage cavity.

14. The aircraft of claim 13 wherein the first and second door members converge toward one another when forming the closed position and diverge away from each other when forming the open position.

15. The aircraft of claim 13 wherein the first and second door members each has an outer centerline door edge, the outer centerline door edges being immediately adjacent to each other when the closed position is formed.

16. The aircraft of claim 15 wherein the outer centerline door edges of the first and second door members are substantially flush with each other when the closed position is formed.

17. An aircraft having minimized overall door edges to reduce a radar signature emission, the aircraft comprising:
a fuselage having a lower fuselage portion;
an internal fuselage cavity defined within the lower fuselage portion and including all retractable/extendable landing gears therein; and
a cavity-enclosing door hingeably engaged to the lower fuselage portion, the cavity-enclosing door including a load-bearing inner door surface which releasibly attaches missile ejection systems with air-to-air missiles thereto, the cavity-enclosing door being continuously positionable at any one of a number of positions lying between stowed and deployed positions formed relative to the internal fuselage cavity to allow launching of the missiles therefrom, the cavity-enclosing door being movable toward and away from the internal fuselage cavity independent of the retraction and extension of the landing gears with respect to the internal fuselage cavity, the cavity-enclosing door enclosing all of the landing gears and missile ejection systems within the internal fuselage cavity when the stowed position is formed to minimize the overall door edges of the fuselage and reduce the radar signature emission from the fuselage.

18. The aircraft of claim 17 wherein the fuselage has an outer fuselage surface and the cavity-enclosing door has outer door edges, the outer fuselage surface and the outer door edges being substantially flush with each other when the stowed position is formed.

19. The aircraft of claim 17 wherein the landing gears are attached within the internal fuselage cavity in a manner as to retract in the stowed position and extend in the deployed position.

20. The aircraft of claim 17 wherein the cavity-enclosing door comprises first and second door members jointly configured to form the stowed and deployed positions relative to the internal fuselage cavity.

21. The aircraft of claim 20 wherein the first and second door members converge toward one another when forming the stowed position and diverge away from each other when forming the deployed position.

22. The aircraft of claim 20 wherein the first and second door members each has an outer centerline door edge, the outer centerline door edges being immediately adjacent to each other in a substantial flush relationship when the stowed position is formed.

23. A method of minimizing overall door edges to reduce a radar signature emission from an aircraft, the aircraft having an internal fuselage cavity with air-to-ground bombs and a single cavity-enclosing door, the method comprising the steps of:
a) launching the aircraft from a runway;
b) retracting all landing gears within the internal fuselage cavity of the aircraft;
c) positioning all of the landing gears and air-to-ground bombs together within the internal fuselage cavity;
d) moving the single cavity-enclosing door toward the internal fuselage cavity independent of and subsequent to the retraction of the landing gears into the internal fuselage cavity;
e) closing the internal fuselage cavity with the single cavity-enclosing door; and
f) minimizing the overall door edges of the aircraft to reduce the radar signature emission from the aircraft due to the enclosure of all of the landing gears and air-to-ground bombs solely through the single cavity-enclosing door.

24. The method of claim 23 further comprising the steps of:
g) defining the aircraft approaching the runway;
h) opening the single cavity-enclosing door to expose the internal fuselage cavity;

i) extending all of the landing gears from the internal fuselage cavity subsequent to opening the single cavity-enclosing door; and j) landing the aircraft on the runway.

25. The method of claim 23 wherein the landing gears in step b) comprise a front landing gear and at least two back landing gears.

26. The method of claim 23 further comprising the steps of:

g) maintaining the aircraft in flight;

h) opening the single cavity-enclosing door to expose the internal fuselage cavity;

i) releasing the air-to-ground bombs from the internal fuselage cavity to strike a selected target; and j) closing the internal fuselage cavity with the single cavity-enclosing door.

27. The method of claim 23 wherein the air-to-ground bombs in step c) are global positioning system (GPS) guided bombs.

* * * * *